United States Patent Office 3,755,601
Patented Aug. 28, 1973

3,755,601
METHODS AND COMPOSITIONS FOR IMPROVING FEED EFFICIENCY OF RUMINANTS USING POLYHALOALDEHYDE CONDENSING PRODUCTS
Roger C. Parish, King of Prussia, and John E. Trei, West Chester, assignors to Smith Kline & French Laboratories, Philadelphia, Pa.
No Drawing. Continuation-in-part of application Ser. No. 881,868, Dec. 3, 1969. This application May 31, 1972, Ser. No. 258,253
Int. Cl. A61k 27/00; A61n 9/24
U.S. Cl. 424—313
5 Claims

ABSTRACT OF THE DISCLOSURE

Certain condensation reaction products of polyhaloaldehydes with active hydrogen containing chemicals when ingested admixed in the feed of ruminants in doses which have no therapeutic or toxic properties and which do not inhibit overall fermentation of the rumen, improve the feed efficiency of the ruminant significantly. The chemical compounds are added to the feed as a uniform additive, used as a premix combined with an edible carrier or dispersed in salt blocks for pasture feeding. Preferred and exemplary compounds to be used as active ingredients are 5,5,5-trichloro-4-hydroxy-2-pentanone and the condensation products of chloral with ethyl or methyl malonate.

---

This application is a continuation-in-part of copending Ser. No. 881,868 filed Dec. 3, 1969, and now abandoned.

This invention relates to new compositions and methods for improving the feed efficiency of ruminant animals such as cattle, sheep, goats, etc., using as active ingredients certain polyhaloaldehyde aldol condensation products, for example those of the following formula:

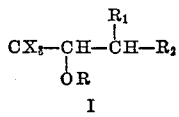

in which:

X is hydrogen or halo, especially chloro and bromo, alternatively the polyhalomethane moiety ($-CX_3$) may be replaced with a polyhaloethyl or polyhalopropyl such as 1,1,2-trichloropropyl or 1,2-dichloroethyl, X always being at least 2 halo atoms;

R is acyl preferably lower alkanoyl of from 2-6 carbon atoms or preferably hydrogen;

$R_1$ is hydrogen, lower alkyl of 1-6 carbon atoms or $-CO_2$-lower alkyl of 2-7 carbon atoms; and $R_2$ is —CO-lower alkyl of 2-7 carbon atoms, $-CO_2$-lower alkyl of 2-7 carbon atoms, or nitro.

In the above-noted terms, lower alkyl alone or combined as in the malonates is preferably of 1-2 carbon atoms, i.e., methyl or ethyl.

The amounts of these active ingredients contained in these new feed compositions and methods of improving the feed efficiency of ruminants will vary over the generic class of active ingredients but will be chosen to be effective for example as demonstrated in various antimethanogensis tests but not toxic, noxious or therapeutic in a medical sense. This aspect of the invention will be detailed later.

To our knowledge the activity of these polyhalo aldol condensation products as ruminant feed additives is novel. U.S. Pat. No. 3,608,087 discloses a group of haloamides, ketones, carboxylic acids or sulfones which have antimethanogenesis activity. The active ingredients in the methods and compositions of this invention however are distinguished chemically from the active ingredients of the No. 3,608,087 patent as will be readily apparent to one skilled in the art.

The active ingredients of this invention are old compounds well-known to the art and easily prepared by an aldol condensation of a polyhalo aldehyde with a compound having an "active" hydrogen. See, for example, Whitmore's Organic Chemistry under aldol or Claisen condensation, or Volume 16 of Organic Reactions. More specific examples of the preparation of active ingredients are found in our copending application, Ser. No. 881,868.

Examples of preferred compounds to be used as active ingredients are:

5,5,5-trichloro-4-hydroxy-2-pentanone,
1,1,1-trichloro-3-nitro-2-butanol,
1,1,1-trichloro-3-amino-2-propanol,
1,1,1-trichloro-3-nitro-2-propanol,
1,1,1-trichloro-2-acetoxy-3-nitropropane,
1,1,1-tribromo-3-nitro-2-propanol,
1,1-dichloro-3-nitro-2-propanol,
1,1-dibromo-3-nitro-2-propanol,
2,3,3-trichloro-5-nitro-4-pentanol,
1,2-dichloro-4-nitro-3-propanol,
4,4,4-trichlorocrotonic acid,
dimethyl 2,2,2-trichloroethylidene malonate,
dimethyl-(2,2,2-trichloro-1-hydroxyethyl)-malonate,
diethyl 2,2,2-tribromoethylidene malonate,
4,4,4-trichloro-3-hydroxybutyric acid,
ethyl-α-(1-hydroxy-2,2,2-trichloroethyl)-acetoacetate,
α-(1-hydroxy-2,2,2-trichloroethyl)-acetoacetic acid,
1,1,1-trichloro-2-acetoxy-4-pentanone,
3-(2,2,2-trichloro-1-hydroxyethyl)-2,4-pentanedione.

The products of the aldol condensation product can be alternatively dehydrated to the olefin during condensation or by a separate dehydration step as is known to the art, see references above. Also, the nitro groups can be optionally reduced, however, unless some additional advantage is sought subsequent chemical steps are not desirable since the cost of the active ingredients should be kept as low as possible for greatest economic advantage for the grower.

The ruminant feeds most generally used in conjunction with the method of this invention are the roughage feeds such as hay, silage or various commercial grain mixtures commonly used in ruminant animals, that is, in cattle or sheep. The amount of additive here will be an amount sufficient to improve the feed efficiency of the animal but not have a pharmacodynamic or therapeutic effect; in the range of about 1 g. to 1 kg. per ton (about 0.001–0.1%) preferably from about 50–400 g. per ton of polyhaloacetaldehyde equivalent. An average 80 lb. sheep will ingest about 3–4 lbs. of food daily. Cattle, up to about 25 lbs. of dry matter. The upper limits of the broad range disclosed here are most useful in cattle. In these and other generic ranges or ratios the amounts referred to are to the haloacetaldehyde equivalents from which the condensation products are derived chemically. Amounts of the end product can be calculated from the haloacetaldehyde by use of the respective equivalent weights.

For commercial use, the active ingredients are most readily used as premix formulations in which the chemical is distributed uniformly throughout a standard animal feed carrier. This premix or concentrate is then mixed with either a normal or a special fattening diet of the ruminant as desired. Examples of such carriers are soybean metal, corn oil, ground corn, barley, wheat, mineral mixtures such as vermiculites, diatomaceous earth, corn gluten meal, corn distillers solubles or soyflour. The active ingredient will be in amounts to satisfy the criteria set forth above for whole feed. The active ingredient will usually be present in from 5–75% by weight of the premix compositions.

The whole animal feeds themselves may also contain cellulosic roughage such as cellulose, hay, straw, corn stalks, oats, barley, and cereal brans; natural oils such as animal fats, fish oils, and whale oil; vegetable oils such as soybean oil, olive oil, safflower oil, peanut oil, and cottonseed oil; antioxidants; minerals; vitamins; antibiotics; anthelmintics; and other appropriate medicaments.

A typical prepared animal feed is as follows:

| Ingredient | | Amount |
|---|---|---|
| Mix hay | percent | 40.0 |
| Ground yellow corn | do | 45.0 |
| Soybean oil meal | do | 7.0 |
| Cane molasses | do | 7.0 |
| Dicalcium phosphate | do | 0.5 |
| Trace minerals salt | do | .5 |
| Vitamin A | I.U./lb. | 300 |
| Vitamin D | I.U./lb. | 150 |
| 5,5,5-trichloro-4-hydroxy-2-pentanone | g./ton of feed | 500 |

An example of a suitable premix is as follows:

| | | |
|---|---|---|
| 2-acetoxy-1,1,1-trichloro-3-nitro-2-propanol | g | 400 |
| Ground yellow corn to 5 lb. | | |

This mix is added to a ton of feed.

In the field the active ingredients may be administered by means of salt or molasses blocks. A typical block may be prepared using the following proportions:

| Ingredient: | Weight percent |
|---|---|
| Dried cane molasses | 39.54 |
| Ground soybean hulls | 14.90 |
| Diethyl 2,2,2-trichloroethylidene malonate | 20.00 |
| Granulated salt | 21.59 |
| Trace minerals and vitamins | 0.20 |
| Stabilized animal fat | 1.11 |
| Moisture | 2.66 |

The method of this invention comprises allowing the cattle or sheep to feed ad libidum on the supplemented rations or to be restricted fed on pasture or under feed lot conditions on a regular schedule.

As examples of the typical animal an 80 lb. sheep may ingest from about 0.1–1 g. of polyhaloacetaldehyde condensation product per day while a 1000 lb. cow may ingest from about 1–4 g. of polyhaloacetaldehyde equivalent per day. Equivalent amounts of other active ingredients may be calculated from these figures. As noted above the polyhaloacetaldehyde derived aldol condensation products are preferred, such as those derived from di or tri-bromo or chloracetaldehydes. The trihaloaldehydes are most useful in giving good yields in the chemical processes.

Normally the greatest feed efficiency is realized from using the method and composition of this invention on rough fodder or normal grain feeding. However, we have found feed efficiency increases of from about 5–15% using normal fattening diets and conditions, the most rigorous test possible.

The ability of the polyhaloacetaldehyde condensates of this invention to improve feed utilization in ruminants is primarily evaluated by means of a test which measures inhibition of in vitro methane gas production and total gas and VFA production as an indicator of the rate of fermentation of feedstuffs by microorganisms of the rumen. Rumen fluid is obtained from a fistulated animal and is filtered through six layers of cheesecloth.. The fluid (75 ml.) is then added to 2.4 g. of experimental ration as substrate. Test compound is then added and the mixture is incubated for 3–4 hours. Test compound may be added as such or, particularly when used in quantities as small as 10 p.p.m. or less, suspended or dissolved in a solvent such as water or ethanol. At the end of the test period, the trapped gases are collected by hypodermic needle from the flask and run through a gas partitioner (column chromatography) which separates and quantitates the components. The liquids (volatile fatty acids, etc.) are analyzed by gas liquid chromatography. Among the products measured are carbon dioxide, methane, and fatty acids having from 2 to 6 carbon atoms. Reduction to the percent methane produced of 20% is considered significant. However, with compounds used in the present invention, reduction of 90–100% is not uncommon. Ability of a particular compound to reduce the amount of methane generated without adversely reducing the overall rate of fermentation is determined by comparing the total ($\mu$moles/ml.) volatile fatty acids produced in control systems with those containing test compound. Also significant is the distribution of fatty acids obtained. A shift from acetate towards the higher molecular weight volatile fatty acids is considered favorable.

The effect of the polyhaloacetaldehyde condensation products of this invention in reducing methane production without causing a significant reduction in the rate of overall fermentation at effective concentrations, when treated by the above procedures, is shown by the data below.

A predetermined molar or percent concentration of test compound in water or ethanol was administered usually in 0.1, 0.5 or 1.0 cc. portions as described above. The data in Table I is for parts of the active ingredient per amount of rumen fluid, i.e., parts per million with resulting significant methane inhibition.

TABLE I

| Compound | P.P.M. | Percent methane reduction |
|---|---|---|
| $CCl_3$—CHOH—$CH_2NH_2$ | 13 | 40 |
| $CCl_3$—CHOH—$CH_2NO_2$ | 13 | 95 |
| $CCl_3$—CH(OCOCH$_3$)CH$_2$NO$_2$ | 13 | 80 |
| $CCl_3$—CHOH—CH$_2$(NO$_2$)CH$_3$ | 13 | 90 |
| $CCl_3$—CH=C—(CO$_2$CH$_3$)$_2$ | 13 | 90 |
| $CCl_3$—CHOH—CH$_2$—CO—CH$_3$ | 13 | 85 |
| $CCl_3$—CH=C—(CO$_2$CH$_2$CH$_3$)$_2$ | 13 | 85 |

The in vitro data presented above was confirmed by in vivo tests as follows.

Each dose level value represents a test group of four head of rumen cannulated sheep. After a control period the animals were fed the additive mixed with morning and evening feed in quantities so that 90% ad libitum amounts of ration were administered. The sheep would eat all the supplemented food in one hour. The results ran for a seven-day period.

Samples were withdrawn from the rumen 4–5 hours after the morning feeding and again 12–15 hours after the evening feeding. Analysis of the samples by gas partitioner and G.L.C. for gas and fatty acid content, respectively, were carried out.

TABLE II (A) 60% concentrate ration, rumen cannulated sheep treated with 300 mg. 5,5,5-trichloro-4-hydroxy-2-pentanone twice a day

| | Control | Treated |
|---|---|---|
| Rumen gases (percent volume): | | |
| $CO_2$ | 72 | [1] 79 |
| $CH_4$ | 27 | [1] 9 |
| $H_2$ | | [1] 12 |
| Volatile fatty acid (molar ratio): | | |
| $C_2$ | 67 | [1] 50 |
| $C_3$ | 20 | [1] 35 |
| $C_4$ | 11 | [1] 13 |
| $C_5$+ higher | 2 | 2 |
| Total ($\mu$moles/ml.) | 77 | 75 |

[1] Different from control (P<.05).

This data, being more comprehensive, replaces that in our parent application on page 12, Table III (B).

| | Control | 500 p.p.m. of $CCl_3CH=C(CO_2C_2H_5)_2$ |
|---|---|---|
| (B) 100% ground hay diet: | | |
| $C_2$ | 76 | [1] 58 |
| $C_3$ | 16 | [1] 27 |
| $C_4$ | 7 | [1] 12 |
| $C_5$ | 1 | 3 |
| Total ($\mu$moles/ml.) | 48 | 50 |

[1] Different from control (P<.05).

We claim:
1. The method for improving the feed utilization of ruminant animals comprising orally administering to such animals an active ingredient in the amount of from about 1 g. to 1 kg. per ton of feed which is effective in improving the feed efficiency of the animals but which does not have a therapeutic or toxic effect, said ingredient being of the formula:

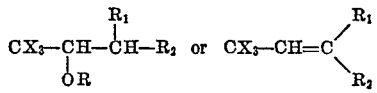

in which:

X is hydrogen, chloro or bromo, at least two of X being chloro or bromo;

R is hydrogen or alkanoyl of 2–6 carbon atoms;

$R_1$ is hydrogen, lower alkyl of 1–6 carbon atoms or $CO_2$-lower alkyl of 2–7 carbon atoms; and $R_2$ is CO-lower alkyl of 2–7 carbon atoms, $CO_2$-lower alkyl of 2–7 carbon atoms or nitro.

2. The method of claim 1 in which the active ingredient is of the formula:

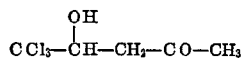

3. The method of claim 1 in which the active ingredient is of the formula:

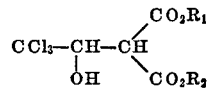

in which $R_1$ and $R_2$ are methyl or ethyl.

4. The method of claim 1 in which the active ingredient is of the formula:

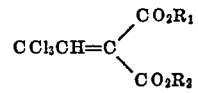

in which $R_1$ and $R_2$ are methyl or ethyl.

5. The method of claim 2 in which the active ingredient is administered in the amount of from about 50–400 g. per ton of feed.

References Cited
UNITED STATES PATENTS

| | | | |
|---|---|---|---|
| 2,844,538 | 7/1958 | Krug et al. | 260—633 X |
| 2,999,118 | 9/1961 | Bachman et al. | 260—633 |
| 3,546,346 | 12/1970 | Katsaros et al. | 424—343 |
| 3,608,087 | 9/1971 | Patchett | 424—320 |

NORMAN YUDKOFF, Primary Examiner

K. P. VAN WYCK, Assistant Examiner

U.S. Cl. X.R.

99—2 G; 424—331, 350